Aug. 23, 1949.  G. PETERSON  2,479,772
METHOD OF AND APPARATUS FOR GEOPHYSICAL EXPLORATION
Filed July 29, 1948  3 Sheets-Sheet 1

INVENTOR.
GLEN PETERSON
BY
*Hudson & Young*
ATTORNEYS

Aug. 23, 1949.  G. PETERSON  2,479,772
METHOD OF AND APPARATUS FOR GEOPHYSICAL EXPLORATION
Filed July 29, 1948  3 Sheets-Sheet 2

INVENTOR.
GLEN PETERSON
BY Hudson & Young
ATTORNEYS

Aug. 23, 1949.　　　　G. PETERSON　　　　2,479,772
METHOD OF AND APPARATUS FOR GEOPHYSICAL EXPLORATION
Filed July 29, 1948　　　　　　　　　　3 Sheets-Sheet 3

INVENTOR.
GLEN PETERSON

ATTORNEYS

Patented Aug. 23, 1949

2,479,772

UNITED STATES PATENT OFFICE 2,479,772

METHOD OF AND APPARATUS FOR GEOPHYSICAL EXPLORATION

Glen Peterson, Tulsa, Okla., assignor to Phillips Petroleum Company, a corporation of Delaware Application July 29, 1948, Serial No. 41,337

19 Claims. (Cl. 177—352)

This invention relates to radio seismic systems and, in a more specific aspect thereof, to a method of and means for determining time delays in the components of the radio seismic system.

Heretofore, seismic systems have ordinarily included a firing mechanism for detonating an explosive charge at a shot point, such explosion producing wave motion in the earth which was picked up, at a plurality of points, by a system of geophones which converted the earth waves into electrical energy. From the geophones, the electrical energy was transmitted by cables to a recording unit, at which a record was made of the currents produced by each of the geophones representing movement of the earth at the various geophone stations.

In such systems, there are various types of time delays associated with different components of the apparatus. For example, a time delay occurs between the time at which a geophone is actuated by an earth wave and the time at which the electrical current produced by the geophone responsive thereto is impressed upon the cable leading to the recording unit. This time delay is normally different for each geophone in the system and obviously introduced errors into the records of the earth waves which oftentimes led to serious and costly errors in drilling wells on the basis of geophysical explorations. In addition, the time delays of the geophones may vary from day to day, responsive to jamming or overloading of the transformers and geophones, together with aging. A further time delay occurs in the recording unit in which there is ordinarily provided a separate amplifier for each geophone. In each such amplifier, a time delay occurs between the time the signal is received at the input circuit of the amplifier and the time at which the signal is recorded by the galvanometer or other device fed by the output of the amplifier. Here again, the time delay may be different for each amplifier unit, resulting in serious inaccuracies in interpreting the records produced by the geophysical system. Even if all these time delays are nearly constant, where they vary from channel to channel, considerable difficulty is encountered in matching record traces and finding reflection patterns. A third source of error present in previous geophone systems results from the difficulty of indicating the time of explosion on each geophone record. The time of explosion, or shot time, is necessary to provide the base from which all subsequent time computations are made. Although considerable work has been directed toward properly indicating the shot time on the record, the prior art systems often failed because the channel through which the shot time was recorded had a different time constant than the channels through which seismic signals were recorded, thus introducing serious errors in interpreting the geological data.

In my copending application Serial No. 35,724, filed June 28, 1948, I have disclosed a radio seismic system in which great advantages in flexibility and adaptability are obtained by replacing the cable connections between the geophone stations and recorder unit by radiant linkages. I have found, in connection with such radio seismic systems, that it is possible to accurately measure all the aforesaid time delays and to provide a very reliable indication of the shot time on each geophone record. The present application is directed to methods of and means for determining such time delays ad accurately indicating them, together with the shot time, on each geophone trace. This enables significant improvements to be made in evaluating and interpreting the data obtained by geological exploration with a radio seismic system and, since the length of the time delays in the apparatus appears on each geophone record as an actual measurement, it is very easy for the computers to utilize such data in making their calculations.

It is an object of the invention to provide a method of accurately determining time delay in each geophone of a radio seismic system and in the respective channels of a multi-channel receiver utilized in such a radio seismic system.

It is a further object of the invention to provide a radio geophone system incorporating apparatus for accurately measuring the time delay in the geophone and receiver units.

It is a still further object of the invention to provide a geophone unit which may be remotely controlled and in which the time delay of the geophone may be accurately determined.

It is a further object to provide a system which is extremely reliable in operation, very flexible, and adapted for use in any type of geological or surface formation.

Various other objects, advantages and features of the invention will become apparent to one skilled in the art from the following detailed description and disclosure taken with the appended drawings, in which.

Figure 1:
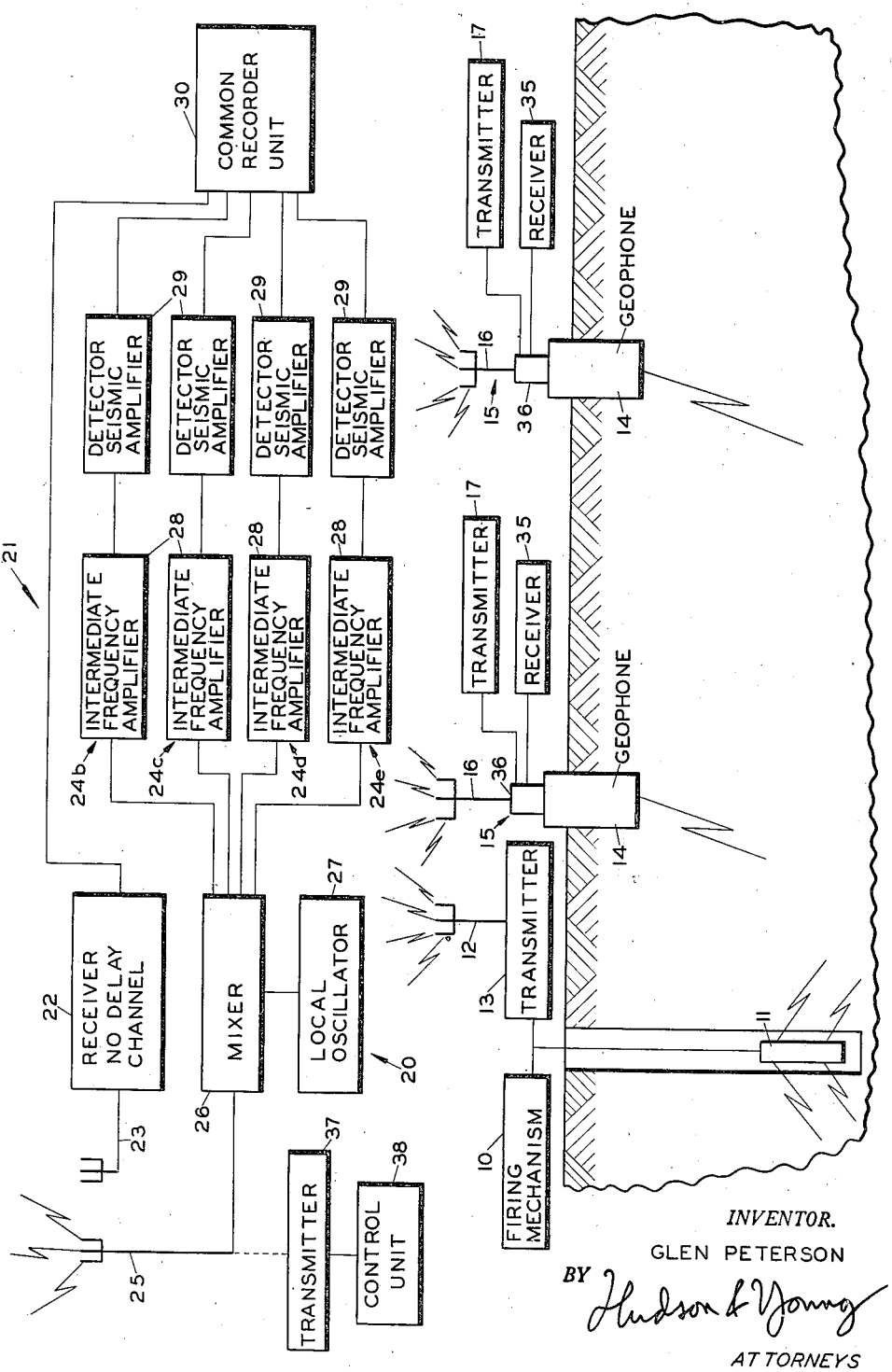
Figure 1 is a block diagram of my novel radio seismic system.

Referring now to the drawings in detail, and particularly to Figure 1, which is a block diagram of the complete radio seismic system constructed in accordance with the present invention, I have shown firing mechanism 10 for detonating an explosive charge 11 which is preferably buried a short distance beneath the ground at the shot point. Detonation of the charge is preferably effected by utilizing a blasting cap having an electrical resistance element therein which is heated to fire the charge, the resulting explosion breaking the heater circuit and causing a radio signal to be emitted from the antenna 12 of a transmitter 13. As will be subsequently explained, this radio signal provides a time base recording the instant at which the shot is fired.

Responsive to the detonation of the charge, seismic waves are propagated through the earth from the shot point and certain of these seismic waves are reflected from subterranean strata, after which they are picked up by geophones 14 and converted into electrical currents. Each geophone 14 is a part of a unit 15 including an antenna 16 and a transmitter 17 which is modulated by the electrical currents produced by the geophone associated therewith. For purposes of illustration, only two geophone units are shown in the drawing but it will be understood that any suitable number may be utilized and that said units may be disposed at any desired location within several miles of the shot point. Each transmitter 17 produces radio waves responsive to the currents produced by the associated geophone 14 and these radio waves are representative of the seismic waves picked up by said geophone.

Figure 4:
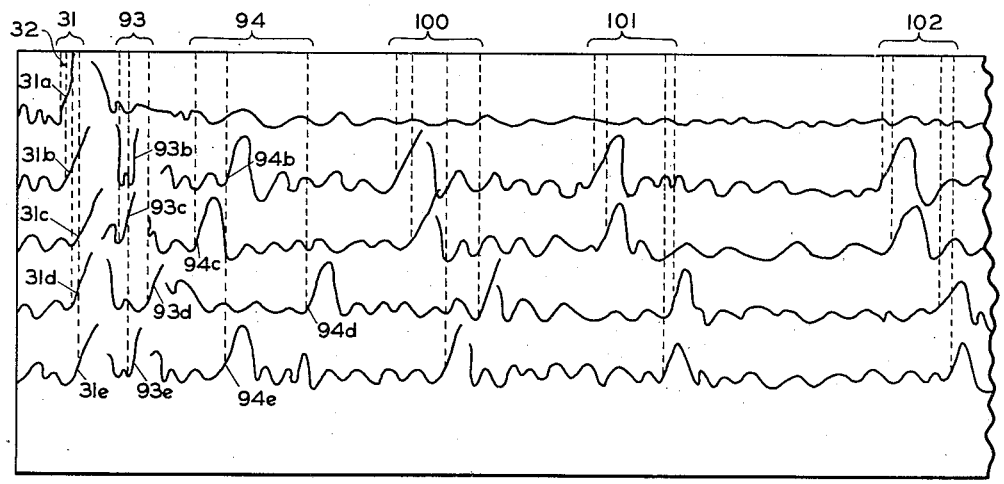
Figure 4 is a view of a typical record produced by the radio seismic system of this invention.

A combination receiver and control unit 20 is provided at any suitable location and this unit includes a multi-channel receiver 21 having a no-delay channel 22 to which signals are fed from an antenna 23 together with a plurality of channels 24b, 24c, 24d and 24e, one of which is provided for each geophone unit 15. Channel 22 is referred to as a no-delay channel because the time delay therein is extremely small as compared to the time delay in the other channels; in fact, it is so small as to be insignificant. The portion of the receiver including the channels 24 is preferably and advantageously constructed in accordance with my copending application Serial No. 35,724, filed June 28, 1948, and includes a common antenna 25 which feeds a mixer 26 wherein the received signals are heterodyned with the output of a local oscillator 27. It will be understood that signals from each of the geophone units 15 are received by antenna 25 and these received signals are separated in mixer 26 so that the intermediate frequency amplifier 28 of each channel 24 receives heterodyne signals which are modulated in accordance with the output of the corresponding geophone unit 15. The output of each intermediate frequency amplifier 28 is fed to a detector-amplifier unit 29 wherein the intermediate frequency signals are converted to audio frequency signals which are amplified and fed to a recorder unit 30 where the signals from each channel are recorded upon a moving strip of sensitized paper. The resulting record is illustrated in Figure 4 wherein each of the horizontal traces represents the output of one of the channels 22, 24.

The shot point transmitter 13 is constructed so that the signals produced thereby cover a relatively wide band of frequencies with the result that the signals emitted from the antenna 12 are picked up by the no-delay channel 22 and each of the channels 24. In contrast, the circuits in each transmitter 17 are very selective so that the signals radiated from each antenna 16 are picked up only in the channel 24 assigned to a particular unit.

In accordance with the invention, the no-delay channel 22 is so constructed that the time delay therein is inappreciable. This can be effected to a great extent by avoiding the use of audio frequency circuits. For example, if the channel 22 is of the heterodyne type, the output of the second detector may be fed directly to the recorder unit 30 without any audio frequency amplification or, alternatively, a beat-frequency oscillator may be incorporated in the second detector stage and the output thereof fed directly to the recorder unit 30. If the channel 22 is not of the heterodyne type, the output of the detector is fed directly to the recorder unit 30, sufficient radio frequency amplification being utilized to insure that the received signal is of the proper strength to operate the recorder unit. Sufficient output may readily be obtained from such a receiver for this purpose since the channel 22 is sensitive only to the signals radiated by the antenna 12 of shot point transmitter 13. The signals from this transmitter may be made as powerful as desired whereas, with respect to the geophone transmitters 17, the input signal is of such small magnitude that audio frequency amplification is usually necessary in the receiver to provide sufficient power output to operate recorder unit 30.

Accordingly, when the firing mechanism 10 is actuated, the charge is detonated and, at the same instant, a signal is radiated from antenna 12. This signal is picked up by the no-delay channel 22 and recorded by unit 30, the resulting trace being shown at 31a in Figure 4. The signal radiated from antenna 12 is also picked up in each of the channels 24 and representative traces are produced by the recorder unit 30, these traces being indicated at 31b, 31c, 31d, and 31e in Figure 4. Due to the fact that audio frequency amplification is necessary in these channels, there is a time delay between the recording of the transmitted signal from channel 22 and that from each of the channels 24. This time delay is represented on Figure 4 by the horizontal displacement of traces 31b to 31e, inclusive, with respect to trace 31a. For example, the distance 32 represents the horizontal displacement of trace 31d with respect to trace 31a and, hence, the time delay in the channel 24d which produces trace 31d. It will be apparent that the time delay in the receiver portion of each channel 24 is measured with an absolute accuracy proportional to the actual delay in channel 22 which may be made as low as .0001 second by the omission of low frequency amplification in the manner previously described.

In accordance with the invention, each geophone unit 15 further includes a dual channel receiver 35 and a control unit 36. As will be hereafter described in detail, one channel of each receiver 35 is sensitive to signals produced by a transmitter 37 and radiated from antenna 25, which is provided with a suitable switch whereby it may be alternatively connected to transmitter 37 or mixer 26. The transmitter 37 is keyed by a control unit 38 and the resultant signals are effective through each receiver 35 and control unit 36 to energize the heater and anode circuits of the associated transmitter just prior to the time that the charge 11 is detonated. The other channel of each receiver 35 is actuated by the signals produced by transmitter 13 and these signals are utilized to measure the time delay in each geophone unit, in the manner hereinafter explained.

Figure 2:
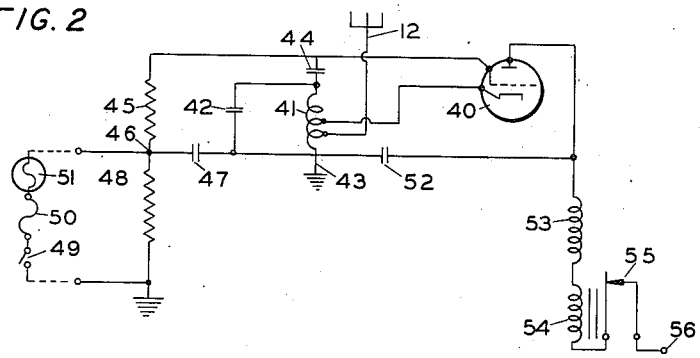
Figure 2 is a schematic circuit diagram of a shot point transmitter.

As previously stated, both the transmitter 13 and the transmitter 37 produce signals which occupy a relatively large band of frequencies so that signals from transmitter 37 are picked up by each of the geophone receivers 35 and so that signals from transmitter 13 are picked up by receiver 21 and geophone receivers 35. A suitable circuit for producing this result is shown in Figure 2 which includes a radio frequency oscillator tube 40 having an anode, a cathode, and a control grid. The cathode is connected to a tap upon a tank inductance 41 which is shunted by a tuning condenser 42. One end of this inductance-capacitance unit is grounded at 43 and the other end thereof is connected through a coupling condenser 44 to the control grid of tube 40. The antenna 12 is connected to another tap of the tank inductance 41. The control grid is also connected to one end of a resistance 45, the other end of which is connected to a terminal 46, a condenser 47 and a resistance 48 being connected between terminal 46 and ground. In the case of shot point transmitter 13, resistor 48 is shunted by a unit including a switch 49, a heater element 50, which is incorporated in the detonator 11 of Figure 1, and a generator or current source 51.

The anode of tube 40 is connected through a feed-back condenser 52 to ground and through a choke 53, a relay coil 54, and relay contacts 55 to a positive power supply terminal 56. The values of resistance 45 and condenser 47 may be so chosen that the oscillator operates in a self-blocking mode. In this case, when switch 49 is closed, the bias on tube 40 is changed, thereby causing a momentary surge of transmitted power during each current cycle, assuming that the generator 51 produces an alternating current.

If the generator 51 is replaced by a battery, a positive bias of sufficient magnitude to unblock the oscillator is momentarily applied thereto when the charge is detonated and the detonation circuit is opened at 50. Alternatively, the resistor 45 may be relatively small and the resistor 48 may be relatively large so that grid modulation of tube 40 is provided when the flow of detonating current is initiated by closure of switch 49. Accordingly, it will be apparent that by suitable choice of the resistors 45 and 48, the transmitter may be adjusted so as to produce a signal only when detonator 50 is broken or, alternatively, to produce an impulse both when detonator 50 is broken and when switch 49 is closed. As soon as the oscillator is energized, relay 54 is opened, with the result that transmission of the signal ceases as soon as the first pulse of current passes through the oscillator circuit and is radiated by antenna 12. Such a circuit was used in producing the trace 31a in Figure 4 wherein it will be observed that no signals are produced by transmitter 13 and recorded by channel 22 after the initial radio wave produced at the instant of detonating the charge. The time delay in this relay, however, may be adjusted, if desired, so that two radio waves are produced by the transmitter 40 before the relay is actuated, one wave being produced when switch 49 is closed and the other being produced when the detonator 50 is broken. By the use of the described circuit, the signals produced by transmitters 13 and 37 may be made to cover a sufficiently broad frequency range as to be received by all of the receivers assigned thereto.

Figure 3:
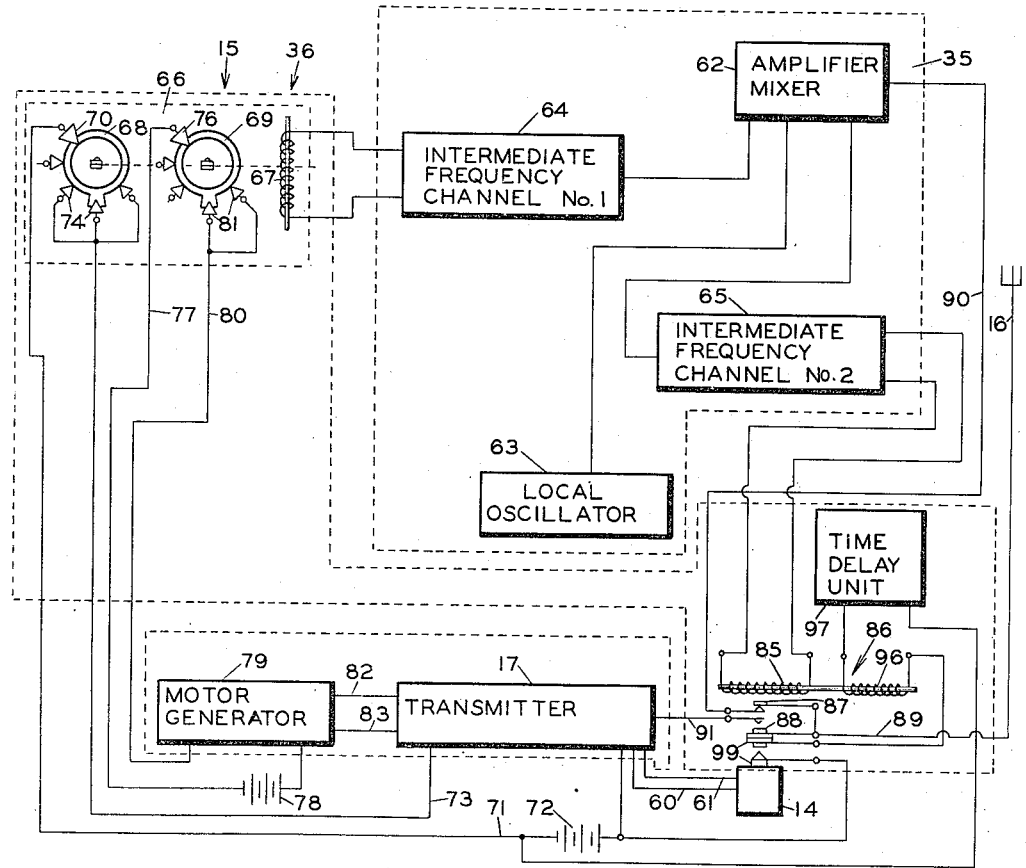
Figure 3 is a combined block and schematic diagram of a geophone unit utilized in the system of Figure 1.

The construction of the geophone unit 15 is shown in detail by Figure 3, in which it will be noted that the geophone 14 is connected to the transmitter 17 by leads 60, 61 in such fashion that the electrical output of the geophone modulates the radio frequency current produced by the transmitter so that the radiated radio waves are representative of the seismic waves to which the geophone is sensitive. In accordance with my invention, I provide a dual channel receiver 35 as a part of the geophone unit, this receiver including a radio frequency amplifier and mixer 62 to which the incoming signals are fed and wherein such incoming signals are heterodyned with the output of a local oscillator 63. Two intermediate frequency channels 64 and 65 are provided, the channel 64 being responsive to the frequency of the signals of transmitter 37, Figure 1, and channel 65 being responsive to signals radiated by transmitter 13, Figure 1.

Also forming a part of each geophone unit 15 is a control unit 36 comprising a motor driven switch 66. Incorporated in the switch 66 is a motor 67 which is driven by the output of receiver channel 64, this motor driving a pair of ganged rotary switches 68 and 69. Rotary switch 68 controls the supply of heater current to transmitter 17 and, to this end, a sliding contact 70 thereof is connected by a lead 71 to a battery 72 or other source of heater current, which in turn is connected to a heater input terminal of transmitter 17, the other heater terminal being connected by a lead 73 to stationary contacts 74 of the switch. Rotary switch 69 controls the supply of anode current to the electron tubes of transmitter 17. To this end, the sliding contact 76 of the switch is connected by a lead 77 to a battery 78 which, in turn, is connected to one terminal of a motor generator unit 79, the other terminal of generator 79 being connected by a lead 80 to stationary contacts 81 of rotary switch 69. The generator 79 is connected by leads 82, 83 to the anode terminals of transmitter 17 and supplies positive plate voltage thereto. When a signal is radiated by transmitter 37, Figure 1, responsive to actuation of the control unit 38, a signal is produced in channel 64 of receiver 35 thereby to operate motor driven switch 66. Thereupon, rotary switch 68 applies heater current to the transmitter 17 and, a short interval thereafter, rotary switch 69 supplies anode current to the transmitter.

The channel 65 of receiver 35 converts signals radiated by transmitter 13 into electrical energy for actuating a winding 85 of a relay 86. This relay includes a set of normally closed contacts 87 and a set of normally open contacts 88, one contact of each set being connected by a lead 89 to the antenna 16. The other contact of set 87 is connected by a lead 90 to the antenna terminal of receiver 35 while the other contact of set 88 is connected by a lead 91 to the antenna terminal of transmitter 17. Accordingly, when the relay is de-energized, antenna 16 is connected to the receiver in readiness to receive control impulses from transmitter 37.

Assuming that motor driven switch 66 has been actuated to supply heater and anode current to transmitter 17, when the firing mechanism 10 of Figure 1 is actuated, a signal is produced by transmitter 13 and received by antenna 16 from which it passes to mixer 62. The heterodyne signal from mixer 62 is fed to intermediate frequency channel 65 and causes actuation of relay 86. As a result, antenna 16 is disconnected from the receiver 35 and connected to transmitter 17 by operation of the contacts 87 and 88. This closure of the transmitting antenna circuit produces a transient radio wave which is radiated from antenna 16, picked up by antenna 25, Figure 1, and fed through the assigned channel 24 of receiver 21 to the recorder unit 30. The resultant trace produced upon the recorder is shown at 93b of Figure 4. A similar action occurs at each of the other geophone units with the resultant production of traces 93c, 93d, 93e by the respective channels 24 of receiver 21 and recorder 30.

In accordance with the invention, the relay 86 is physically mounted or connected to the casing of geophone 14. Accordingly, closure of the relay contacts produces a mechanical shock upon the geophone casing which is picked up by the geophone in the same manner as a seismic wave. The resulting electrical current produced by the geophone modulates transmitter 17 and produces a second radio wave which is radiated from antenna 16, picked up by the respective channels 24 of receiver 21 and recorded by the unit 30, the resulting traces being shown at 94b, 94c, 94d, and 94e on the graph of Figure 4. There is a time delay between the mechanical shock impressed upon geophone 14 (which is concurrent with the transient radio wave produced by closure of relay 86) and the time at which the resulting signal is radiated from antenna 16. Although this time delay is quite small, it is of sufficient duration as to be extremely important in geophysical prospecting. It will be apparent that this time delay for each channel is indicated by the distance between the traces 93 and 94 and that it varies significantly with the different geophones and geophone amplifiers utilized in the system. In accordance with this invention, the delay is accurately measured and can readily be taken into consideration in evaluating the data obtained from the recorder unit. Thus, the distance between each trace 93 and the corresponding trace 94 represents the time interval between the mechanical shock applied to the geophone and the radio signals transmitted by antenna 16. Since the same channel is utilized for making both traces, no inaccuracy is introduced by the time delays involved in the receiver channels 24, or other parts of the apparatus, although the delay in the channels 24 is accurately measured by traces 31 which, of course, must be utilized in evaluating the graph of Figure 4.

I provide a holding circuit for relay 86 to maintain the transmitter and associated circuits in an energized position for a predetermined interval after it is actuated so that electrical currents produced by subsequent seismic waves propagated from shot point 11 may be utilized to modulate transmitter 17 and radiate a representative signal from antenna 16. This holding circuit includes a relay winding 96 which is connected in circuit with a time delay unit 97, the heater battery 72, and a set of normally open contacts 99 on relay 86. Thus, when the relay is energized, the coil 96 maintains it in closed position for a predetermined interval determined by the setting of time delay unit 97 which may conveniently be a thermal unit of well-known design. Or in the simplest case, the unit 97 may be omitted and relay winding 96 replaced with a single short circuited turn of copper, usually in the form of a band or ring. In this instance, however, both the closing and opening times of the relay are long, and the contacts must accordingly be adjusted to operate exactly when the geophone case is tapped.

During the aforesaid predetermined interval, seismic signals are received by the geophone and these signals modulate the transmitter 17 thereby producing radio waves which are radiated by antenna 16, picked up by receiver 21, and provide traces 100, 101, and 102, Figure 4, in the recorder unit. The time delay effected by the unit 97 is sufficient that all the signals may be recorded which are of interest in the geological work. Thereafter, relay 86 is de-energized with the result that the antenna is disconnected from transmitter 17 and connected to receiver 35. Thereupon, a second impulse from transmitter 37 may be utilized to operate motor driven switch 66 through channel 64 and reset switches 68 and 69, thereby cutting off the anode and heater currents to the transmitter.

The overall operation of the system will now be apparent to those skilled in the art. Assuming that the firing mechanism, geophone units, and recording unit are all properly located, the control unit 38 is energized thereby producing a first radio signal which is transmitted to the geophone units 15 causing the operation of the respective motor driven switches 66 which successively energize the heater and anode circuits of the geophone transmitters 17. Thereupon, firing mechanism 10 is actuated causing a wide band of signals to be radiated by transmitter 13. These signals are picked up by receiver 21 and form the traces 31, Figure 4, in the recorder which measure the time delay in the respective channels of receiver 21.

The signals from transmitter 13 are also picked up by the geophone receivers 35 causing operation of the respective relays 86. This disconnects the antenna from each geophone receiver and connects it to the transmitter 17 thereby producing a transient radio frequency wave which is recorded by the traces 93 in Figure 4. Closure of the relay also impresses a mechanical shock upon each geophone which modulates the geophone transmitter and produces a radio wave recorded by traces 94 in Figure 4, the interval between trace 93 and trace 94 in each channel being a measure of the time delay in the geophone assigned thereto. The described closure of the relay 86 also energizes a holding circuit which maintains transmitter 17 in operating condition while the seismic waves are picked up by geophone 14, radiated from transmitter 17, and recorded by traces 100, 101, 102 of Figure 4. After the seismic signals are recorded, the time delay unit 97 permits relay 86 to open thereby disconnecting antenna 16 from the transmitter and connecting it to receiver 35. Thereupon, transmitter 37 may be again actuated to reset the respective motor driven switches 66 and turn off the power supply of transmitter 17.

It will be apparent that I have provided a radio seismic system in which time delays in all parts of the apparatus are measured with extreme accuracy and in which the transmitting apparatus at each geophone station is remotely controlled. Such a system permits unusual flexibility in the arrangement of the geophones while providing results of extreme accuracy which are very useful in geophysical prospecting.

While the invention has been described in connection with a present, preferred embodiment thereof, it is to be understood that this description is illustrative only and is not intended to limit the invention, the scope of which is defined by the appended claims.

Having described my invention, I claim:

1. The method of determining time delay in a geophone of a seismic system wherein electrical signals are transmitted from said geophone to a recording unit, which comprises producing an impulse in the transmitting system and simultaneously mechanically shocking said geophone to produce a second impulse in the transmitting system, and measuring the time interval between said impulses thereby to determine the time delay in said geophone.

2. The method of determining time delay in a geophone of a radio seismic system wherein a radio transmitter is modulated by the electrical output of said geophone, which comprises exciting said transmitter to produce a radio wave and simultaneously impressing a mechanical impulse on said geophone to produce a second radio wave through modulation of said transmitter, the interval between said radio waves being a measure of the time delay in said geophone.

3. The method of determining time delay in a geophone of a radio seismic system wherein a radio transmitter is modulated by the electrical output of said geophone, which comprises detonating an exposive charge at a shot point and simultaneously therewith radiating a radio signal, receiving said signal at the geophone location, converting this received signal into a mechanical control impulse, utilizing said mechanical control impulse to excite said geophone transmitter thereby producing a radio wave and simultaneously to mechanically shock said geophone thereby to produce a second radio wave through modulation of said geophone transmitter, the time interval between said radio waves being a measure of the time delay in said geophone, and the time interval between said radio signal and said first radio wave being a measure of the time delay in the aforesaid receiving and converting steps.

4. The method of determining time delay in the receiver circuits and geophones of a radio seismic system wherein a multi-channel receiver picks up radio impulses from a transmitter at the shot point and from transmitters actuated by a plurality of geophone units, said receiver having a no-delay channel assigned to the shot point transmitter in which the time delay is inappreciable, and other channels assigned to the respective geophones, which comprises radiating a radio signal from the shot point transmitter at the instant an explosive charge is fired, picking up said signal in each channel of said receiver, recording said signal whereby the recorded interval between the no-delay channel signal and the signal in the other channels is a measure of the time delay in said other channels, radiating a radio wave from each of the other transmitters substantially concurrently with the firing of the charge, and simultaneously with the radiation of said radio wave impressing a mechanical impulse on each of said geophones to produce second radio waves through modulation of the respective geophone transmitters, picking up the radio waves from the geophone transmitters in the respective channels of said receiver, and recording the received signals whereby the interval between the first and second radio waves in each channel is a measure of the time delay in the geophone assigned to said channel.

5. The method of determining time delay in the receiver circuits and geophones of a radio seismic system wherein a multi-channel receiver picks up radio impulses from a transmitter at the shot point and from transmitters actuated by a plurality of geophone units, said receiver having a no-delay channel assigned to the shot point transmitter in which the time delay is inappreciable and other channels assigned to the respective geophones, which comprises radiating a radio signal from the shot point transmitter at the instant an explosive charge is fired, picking up said signal in each channel of said receiver, recording said signal whereby the recorded interval between the no-delay channel signal and the signal in the other channels is a measure of the time delay in said other channels, picking up the transmitted signal at each geophone station, transforming the received signal into a mechanical control impulse to excite each geophone transmitter with resultant radiation of radio waves therefrom and simultaneously impressing said mechanical impulse on each of said geophones to produce second radio waves through modulation of the respective geophone transmitters, picking up the radio waves from the geophone transmitters in the respective channels of said receiver, and recording the received signals whereby the interval between the first and second radio waves in each channel is a measure of the time delay in the geophone assigned to said channel.

6. The method of determining time delay in the respective channels of a multi-channel receiver having a no-delay channel in which the time delay is inappreciable and having recorder units actuated by the signals fed through the respective channels which comprises firing an explosive charge at a shot point and simultaneously radiating a radio wave from the shot point for reception in each channel of said receiver, whereby the record of said wave in the no-delay channel indicates the shot time and the record of said radio wave in the remaining channels is a measure of the time delay in said remaining channels.

7. The method of determining time delay in the respective channels of a multi-channel receiver having recorder units actuated by the signals fed through the respective channels which comprises providing a no-delay channel in which the time delay is inappreciable, and simultaneously impressing a signal upon the input circuits of all of said channels, whereby the intervals between the record of said signal in the no-delay channel and the record of said signal in the remaining channels is a measure of the time delay in said remaining channels.

8. A radio geophone system comprising, in combination, a receiver-recorder unit, a geophone, a transmitter modulated by the electrical currents produced by said geophone, means for actuating said transmitter to produce a radio wave and for simultaneously applying a mechanical shock to said geophone, the resultant electric current produced by said geophone modulating said transmitter to produce a second radio wave, the time interval between the radio waves recorded by said receiver unit being a measure of the time delay in said geophone.

9. A radio geophone system comprising, in combination, a multi-channel receiver, a recorder unit for each channel, a plurality of geophones assigned to the respective channels of said receiver, a transmitter at each geophone location modulated by the electrical current produced by the associated geophone, means for actuating each transmitter to produce a first radio wave and for simultaneously applying a mechanical shock to the associated geophone, the resultant electrical current produced by the geophone modulating the transmitter to produce a second radio wave, the time interval between said radio waves recorded by the corresponding channel of said receiver being a measure of the time delay in said geophone unit.

10. A radio geophone system comprising, in combination, a multi-channel receiver, a recorder for each channel, a geophone assigned to each channel, a transmitter modulated by the electrical currents produced by each geophone, a receiver at each geophone location for transforming and converting received signals into control impulses, firing mechanism for detonating an explosive charge, a transmitter actuated by said firing mechanism for producing a radio wave when the explosive charge is fired, said radio wave being picked up by the geophone receivers, means for utilizing the resultant control impulses to excite the respective geophone transmitters to produce radio signals, means for simultaneously utilizing said control impulses to mechanically shock the respective geophones and produce second radio waves through modulation of the geophone transmitters, the resultant signals being radiated to said receiver and being recorded by said recorder units, the time delay between said signals in each channel being a measure of the time delay in the geophone assigned to said channel.

11. A radio geophone system comprising, in combination, a multi-channel receiver, a recorder for each channel, a geophone assigned to each channel, a transmitter modulated by the electrical currents produced by each geophone, a receiver at each geophone location for converting received signals into mechanical impulses for controlling the associated transmitter, and a transmitter at the recording location for energizing all of said receivers.

12. A radio geophone system comprising, in combination, a multi-channel receiver and recorder unit incorporating a no-delay channel in which the time delay is insignificant, a geophone unit assigned to each of the other channels, each unit including a geophone, a transmitter modulated thereby, a source of current for said transmitter, and a dual channel receiver, a transmitter at the recording location for radiating first radio waves of suitable frequency to be picked up by one channel of the geophone receivers, means associated with said one channel for converting the received waves into a control impulse, means actuated by said control impulse to connect said power source to the associated geophone transmitter, a detonator for firing an explosive charge, a transmitter controlled by said detonator for producing a second radio wave when the charge is fired, said second signal being received by all the channels of said multi-channel receiver and by the second channel of said geophone receivers, means associated with each second channel for converting the received signal into a second control impulse, means actuated by said second control impulse for exciting the associated geophone transmitter to produce third radio waves and for mechanically shocking the associated geophone, said mechanical shock producing a geophone current which modulates the associated geophone transmitter to produce fourth radio waves, the recorded intervals between the third and fourth radio waves in each channel of said receiver being a measure of the time delay in the geophone assigned to said channel, and the time intervals between the second radio waves in the no-delay channel and in the other channels being a measure of the time delay in said other channels.

13. A geophone unit for a radio seismic system comprising, in combination, a geophone, a transmitter modulated by the electrical output of said geophone, a switch mounted on the geophone casing controlling the energization of said transmitter, and means for closing said switch to energize said transmitter and simultaneously apply a mechanical impulse to said geophone.

14. A geophone unit for a radio seismic system comprising, in combination, a geophone, a transmitter modulated thereby, a relay mechanically connected to the casing of said geophone, said relay having a set of contacts controlling the radiation of signals from said transmitter, means for applying an electrical impulse to said relay to close said contacts thereby radiating a wave from said transmitter and simultaneously mechanically shocking said geophone, a holding circuit for said relay, and a timer in said holding circuit for maintaining said relay in energized position for a predetermined interval after it is actuated by said electrical impulse.

15. A geophone unit for a radio seismic system comprising, in combination, a geophone, a transmitter modulated thereby, an antenna for said transmitter, a relay mechanically connected to said geophone and disposed in circuit with said antenna, means for actuating said relay thereby to connect said transmitter to said antenna with resultant radiation of a transient radio wave therefrom, actuation of said relay also causing a mechanical impulse to be impressed on said geophone, said impulse producing a second radio wave through modulation of said transmitter by said geophone, the time interval between said radio waves being a measure of the time delay in said geophone.

16. A geophone unit for a radio seismic system comprising, in combination, a geophone, a transmitter modulated thereby, an antenna, a receiver unit for converting received signals into electrical energy, a relay mechanically connected to said geophone having a normally open set of contacts and a normally closed set of contacts, said latter contacts connecting said antenna to said receiver, and said open contacts being adapted to connect said antenna in circuit with said transmitter, and means connecting the output of said receiver to said relay whereby said relay is energized when a signal is received by said receiver, such energization of the relay connecting said antenna to the transmitter with resultant radiation of a transient radio wave therefrom, actuation of said relay also causing a mechanical impulse to be impressed on said geophone, said impulse producing a second radio wave through modulation of said transmitter by said geophone, the time interval between said radio waves being a measure of the time delay in said geophone.

17. A geophone unit for a radio seismic system comprising, in combination, a geophone, a transmitter modulated thereby, a power supply for said transmitter, a dual channel receiver in which the channels are sensitive to signals of different frequencies, an antenna, a relay mechanically connected to said geophone and having a normally closed set of contacts connecting said antenna to said receiver, said relay having a second set of contacts for connecting said antenna to the transmitter when the relay is energized, means actuated by one channel of said receiver for connecting said power source to said transmitter upon reception of a signal of proper frequency, means actuated by the other channel of said receiver for closing said relay upon reception of a signal of different frequency, such closure of the relay disconnecting said antenna from the receiver and connecting it to the transmitter with resultant radiation of a transient radio wave, said closure of the relay also causing a mechanical impulse to be impressed on said geophone, said impulse producing a second radio wave through modulation of said transmitter by said geophone, the time interval between said radio waves being a measure of the time delay in said geophone.

18. A geophone unit for a radio seismic system comprising, in combination, a geophone, a transmitter modulated thereby, a source of heater current for said transmitter, a source of anode current for said transmitter, a motor driven switch which is operable to successively connect the heater and anode current sources to said transmitter, a dual channel receiver in which the respective channels are sensitive to signals of different frequencies, an antenna, a relay mechanically connected to said geophone for normally connecting said antenna to said receiver, said relay being adapted upon closure thereof to connect the antenna to said transmitter, means actuated by one channel of said receiver to operate said motor driven switch thereby to supply current to said transmitter, means actuated by the other channel of said receiver for energizing said relay thereby disconnecting the antenna from said receiver and connecting it to said transmitter with resultant radiation of a transient radio wave therefrom, actuation of said relay also causing a mechanical impulse to be impressed on said geophone, said impulse producing a second radio wave through modulation of said transmitter by said geophone, the time interval between said radio waves being a measure of the time delay in said geophone.

19. A geophone unit for a radio seismic system comprising, in combination, a geophone, a transmitter modulated thereby, a source of heater current for said transmitter, a source of anode current for said transmitter, a motor driven switch which is operable to successively connect the heater and anode current sources to said transmitter, a dual channel receiver in which the respective channels are receptive to signals of different frequencies, an antenna, a relay having a set of normally closed contacts connecting said antenna to said receiver and a normally open set of contacts connecting said antenna to said transmitter, a third set of contacts on said relay, a holding circuit actuated by said third set of contacts including said heater current source, a winding of said relay, and a timing device whereby said relay is maintained in energized position for a predetermined interval of time after actuation thereof, means actuated by one channel of said receiver to operate said motor driven switch upon reception of a signal of proper frequency to successively apply heater and anode current to said transmitter, means actuated by the other channel of said receiver upon reception of a signal of different frequency for closing said relay thereby to disconnect said antenna from said receiver and connect it to said transmitter with resultant radiation of a transient radio wave, said holding circuit maintaining the relay in energized position for a predetermined interval after the antenna is connected to said transmitter, said actuation of the relay also causing a mechanical impulse to be impressed on said geophone, said impulse producing a second radio wave through modulation of said transmitter by said geophone, the time interval between said radio waves being a measure of the time delay in said geophone.

GLEN PETERSON.

No references cited.